Patented May 27, 1952

2,598,126

UNITED STATES PATENT OFFICE 2,598,126

AZO DYESTUFFS AND A PROCESS OF MAKING SAME

Ernst Iselin and Walter Wehrli, Basel, Switzerland, assignors to Sandoz Limited, Basel, Switzerland, a Swiss firm No Drawing. Application July 13, 1949, Serial No. 104,588. In Switzerland July 16, 1948

13 Claims. (Cl. 260—154)

It is known that azines can be obtained from ortho-aryl-aminoazo compounds by treatment with acids (see e. g. Fierz-David "Künstliche organische Farbstoffe," Berlin 1926, page 309). In a similar manner hydroxyazine-sulfonic acids can be prepared which are capable of coupling with diazo compounds to form azo dyestuffs (see U. S. Patent No. 1,877,743).

It has now been found that azo dyestuffs containing the azine ring can also be obtained when azo dyestuffs of the formula

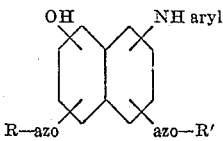

wherein the naphthalene residue must contain at least one sulfonic acid group united to the nucleus and in which aryl denotes a substituted or unsubstituted benzene or naphthalene residue containing at least one free position ortho to the imino group, R-azo and R'-azo are any desired residues of diazo compounds containing if desired further azo linkages and in which both R-azo and OH as well as R'-azo and NH-aryl are in the ortho-position to one another and treated with acids or acid salts, while warming if desired.

Compared to the known methods for the preparation of azo dyestuffs containing the azine ring, the new process offers a method whereby the azine ring formation is completed at the last stage in the process which is an appreciable advantage. Whereas the known hydroxynaphthophenazine-sulfonic acids or hydroxydinaphthazine-sulfonic acids used for coupling possess only a slight coupling energy, the azo dyestuffs obtainable from arylamino-hydroxynaphthalene sulfonic acids by acid coupling in the ortho-position to the NH-aryl group, couple smoothly and can also be combined with diazo compounds which only couple with slight energy and which therefore react with the above named azines only incompletely or not at all.

The conversion of the dis- or polyazo-dyestuffs used according to the process into the dyestuffs containing the azine ring can take place either in aqueous solution by warming with acids or acid salts or by introducing the dyestuffs into concentrated acids at room temperature, if desired with cooling.

As acids there can be used for instance: hydrochloric acid, hydrobromic acid, sulfuric acid, phosphoric acid, formic acid, acetic acid, oxalic acid, methane sulfonic acid, benzene mono- and disulfonic acid and naphthalene mono-, di- and trisulfonic acid. As acid salts there can be used for instance alkaline metal bisulfates, primary alkaline metal phosphates and acid alkaline metal oxalates.

Dis- and polyazo dyestuffs which are suitable for azine ring closure according to the present process can for example be obtained from the following arylaminohydroxynaphthalene sulfonic acids: 2-arylamino-5-hydroxynaphthalene-7-sulfonic acid, 1-arylamino-8-hydroxynaphthalene-4-sulfonic acid, 1-arylamino-8-hydroxynaphthalene-4,6-disulfonic acid, 1-arylamino-7-hydroxynaphthalene-4-sulfonic acid.

The dyestuffs which can be obtained according to the present process in those cases where they contain groups capable of forming metal complexes can be converted in the usual manner into the metal complex by treating them with metal salts, e. g. copper, chrome, cobalt, nickel, iron and manganese salts. Most of these metal complex compounds possess outstanding fastness properties.

The following examples which are given by way of showing how the invention may be carried out in practice are non-limitative. The parts are by weight.

*Example 1*

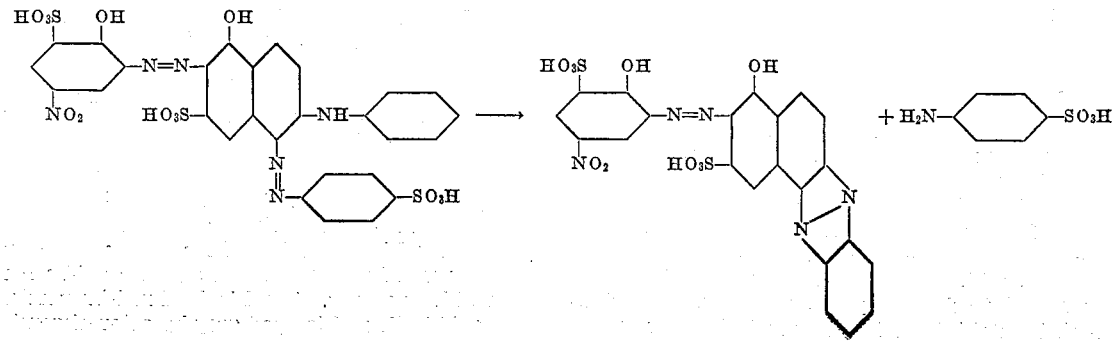

23.4 parts of 4-nitro-2-aminophenol-6-sulfonic acid were diazotised in the usual way and coupled in the presence of soda while cooling with ice with 54.3 parts of the sodium salt of the nonoazo dyestuff obtained by coupling diazotised sulfanilic acid with 2-phenylamino-5-hydroxynaphthalene-7-sulfonic acid in an acid medium. For facilitating the coupling 5–10% by volume of pyridine bases may be added. After coupling is finished the diazo dyestuff is isolated. It dissolves in water with a red colour and in concentrated sulfuric acid with a blue-green colour.

In order to close the azine ring the disazo dyestuff is dissolved in 1400 parts of hot water and treated at 85–90° C. with 110 parts of 30% hydrochloric acid. It is stirred for 2 hours at 85–90° C., then made alkaline and isolated as usual. The dyestuff dissolves in water with a blue-grey colour and in concentrated sulfuric acid with a green colour; wool is dyed from acid baths in brownish-red shades and by after-chroming in dark olive shades of noteworthy fastness properties. The dyestuff is identical with that obtained by alkaline coupling of diazotised 4-nitro-2-aminophenol-6-sulfonic acid with 5-hydroxy-1.2-naphthophenazine-7-sulfonic acid in the presence of pyridine bases with noticeably smaller yields of the dyestuff. The sulfanilic acid obtained in the ring closure can be used again for further batches.

If in this example there is used instead of the azo dyestuff obtained by acid coupling of diazotised sulfanilic acid with 2-phenylamino-5-hydroxynaphthalene-7-sulfonic acid the corresponding dyestuff from 2-phenylamino-5-hydroxy-naphthalene-7-sulfonic acid and diazotised aniline, diazotised orthanilic or metanilic acid, then the same azine dyestuff is obtained. Instead of hydrochloric acid there can be used with the same effect hydrobromic acid, sulfuric acid or phosphoric acid.

*Example 2*

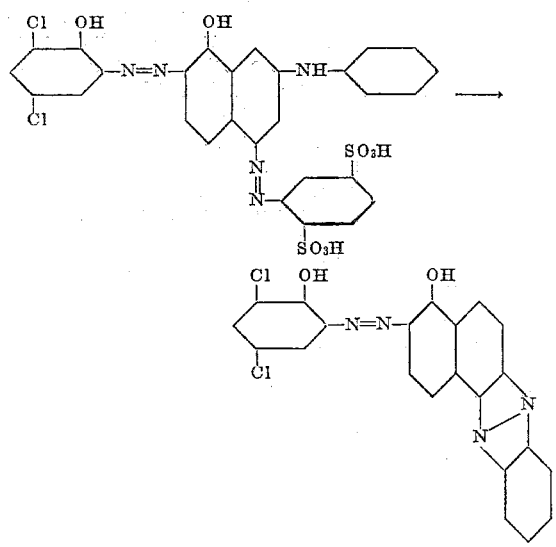

17.8 parts of 4.6-dichlor-2-aminophenol are diazotised in the usual manner and coupled with ice cooling in the presence of sodium carbonate with 64.5 parts of the sodium salt of the monoazo dyestuff obtained by the acid coupling of diazotised 1-amino-benzene-2.5-disulfonic acid with 2 - phenylamino - 5 - hydroxynaphthalene - 7 - sulfonic acid. 5–10% by volume of pyridine can be added to facilitate the coupling. The dyestuff thus obtained dissolves in hot water with a dark bluish-red colour and in concentrated sulfuric acid with a dark green colour. In order to close the azine ring it is added at 40° C. to 650 parts of concentrated sulfuric acid, stirred for 2 hours at 40° C., poured into ice and water and isolated. The azine dyestuff is a dark powder which dissolves in hot water with a blue colour and in concentrated sulfuric acid with a green colour. Wool is dyed from acid baths in brown shades and by after-chroming in grey shades with noteworthy fastness properties. This dyestuff cannot be prepared by coupling diazotised 4.6-dichlor-2-aminophenol with 5-hydroxy-1.2-naphthophenazine-7-sulfonic acid as the coupling energy both of the diazo compound and of the azine is too small.

In place of the monoazo dyestuff from diazotised 1-aminobenzene-2.5-disulfonic acid and 2-phenylamino - 5 - hydroxynaphthalene - 7 - sulfonic acid the coupling products from diazotised 4-chloraniline-2-sulfonic acid, 1-naphthylamino-4-sulfonic acid or 2-naphthylamino-4.8-disulfonic acid with 2 - phenylamino - 5 - hydroxynaphthalene-7-sulfonic acid can be used with similar results. The final dyestuff is in all cases the same.

If instead of 2 - phenylamino - 5 - hydroxynaphthalene - 7 - sulfonic acid, there is used 2 - (4' - hydroxy - 5' - carboxy) - phenylamino-5-hydroxynaphthalene-7-sulfonic acid for the preparation of the acid coupled monoazo dyestuff, then there is obtained a final dyestuff of similar shades and similar fastness properties. Instead of sulfuric acid there can be used with the same effect organic acids, as for instance formic acid, acetic acid or oxalic acid.

*Example 3*

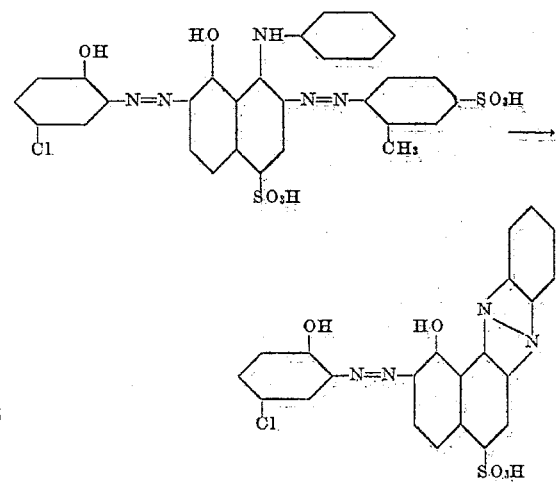

14.4 parts of 4-chlor-2-aminophenol are diazotised as usual and coupled in the presence of sodium carbonate to render alkaline with ice cooling and, if desired, with the addition of 5–10% by volume of pyridine, with 55.7 parts of the sodium salt of the monoazo dyestuff obtained by acid coupling of diazotised 2-toluidine-4-sulfonic acid with 1 - phenylamino - 8 - hydroxynaphthalene-4-sulfonic acid. Thereupon the product of the coupling is added to 650 parts of concentrated sulfuric acid at 40° C. and stirred for 2 hours at 40° C. When poured into ice and water and filtered, the dyestuff forms a red powder which dissolves in water with a red colour and in concentrated sulfuric acid with a blue-black colour. Wool is dyed red-brown from an acid bath and is dyed grey by after-chroming, whereby dyeings of good fastness properties are obtained.

This dyestuff is not obtainable by coupling diazotised 4-chlor-2-aminophenol with 8-hydroxy-1.2-naphthophenazine-4-sulfonic acid as the latter will not couple with diazotised 4-chlor-2-aminophenol. Instead of sulfuric acid there can be used acid salts as for instance alkaline metal bisulfates, primary alkaline metal phosphates or acid alkaline metal oxalates.

*Example 4*

24.4 parts of dianisidine are tetrazotised as usual and coupled in the presence of soda and with ice cooling with 38.4 parts of 1-hydroxynaphthalene-3.6.8-trisulphonic acid. After formation of the intermediate compound has ensued an alkaline solution of 54.3 parts of the sodium salt of the monoazo dyestuff obtained by acid coupling of diazotised sulfanilic acid with 2 - phenylamino - 5 - hydroxynaphthalene - 7 - sulfonic acid is added. After the coupling is finished the dyestuff of the formula

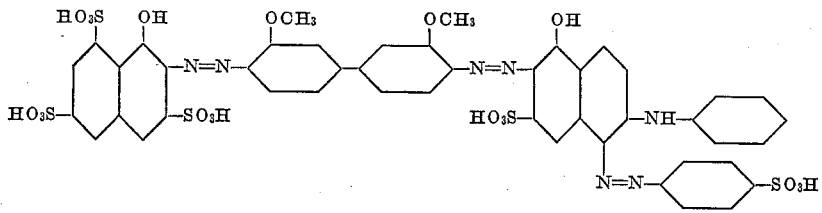

is isolated; this dissolves in hot water with a blue colour and in concentrated sulfuric acid with a greenish-blue colour.

For conversion into the dyestuff containing the azine ring the trisazo dyestuff is dissolved hot in 1000 parts of water, 67 parts of 30% hydrochloric acid added at 85–90° C., and the product stirred for 1 hour at this temperature. When the azine formation is finished the solution is made alkaline and the dyestuff isolated. It is soluble in hot water with a greenish-blue colour and in concentrated sulfuric acid with a green colour and can be converted into a copper complex by the usual processes. This complex dyes cotton and regenerated cellulose in bright greenish-blue shades of excellent fastness to light and to washing.

A copper complex having even brighter dyeing properties with very similar shades is obtained by the use of acid monoazo dyestuffs obtained from 2 - p - anisidylamino - 5 - hydroxynaphthalene-7-sulfonic acid. Instead of hydrochloric acid there can be used with the same effect organic acids as for instance methane sulfonic acid, benzene mono- and disulfonic acids or naphthalene mono-, di- and trisulfonic acids.

If, instead of 38.4 parts of 1-hydroxynaphthalene-3:6:8-trisulfonic acid, 30.4 parts of 1-hydroxynaphthalene-3:8-disulfonic acid or 30.4 parts of 1-hydroxynaphthalene-3:6-disulfonic acid or 32.0 parts of 1:8-dihydroxynaphthalene-3:6-disulfonic acid are used, there will be obtained dyestuffs of similar shades and fastness properties.

*Example 5*

24.4 parts of dianisidine are tetrazotized in the conventional way and combined with 30.4 parts of 1-hydroxynaphthalene-3:8-disulfonic acid in the presence of sodium carbonate and while cooling with ice. After formation of the intermediate product an alkaline solution of the sodium salt of 71.1 parts of the monoazo dyestuff produced by acid coupling diazotized sulfanilic acid with 5:5'-dihydroxy-7:7'-disulfo-2:2'-dinaphthylamine is added. The coupling operation being completed the dyestuff of the formula

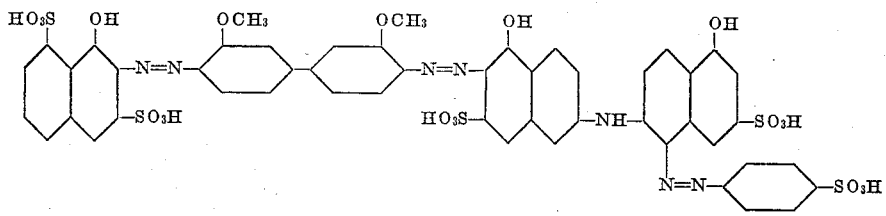

is isolated and dissolves then in hot water with a blue coloration.

For converting the trisazo dyestuff into the dyestuff containing the azine ring the former is dissolved hot in 1200 parts of water, whereupon at a temperature of 85–90° C. 50 parts of 30% hydrochloric acid are added and the whole stirred at this temperature for one hour. After formation of the azine structure the solution is made alkaline and the dyestuff isolated, whereupon it is soluble in water with a greenish blue color and in concentrated sulfuric acid with a blue green color. The dyestuff can be converted into a copper complex according to conventional methods. The same dyes cotton and regenerated cellulose in vivid greenish blue shades of excellent fastness properties to light and to washing.

When using, instead of 30.4 parts of 1-hydroxynaphthalene-3:8-disulfonic acid, the same quantity of 1-hydroxynaphthalene-3:6-disulfonic acid or 32.0 parts of 1:8-dihydroxy-naphthalene-3:6-disulfonic acid or 38.4 parts of 1-hydroxynaphthalene-3:6:8-trisulfonic acid and working otherwise in the same manner as indicated above, dyestuffs will be produced which give similar shades and possess analogous properties.

Example 6

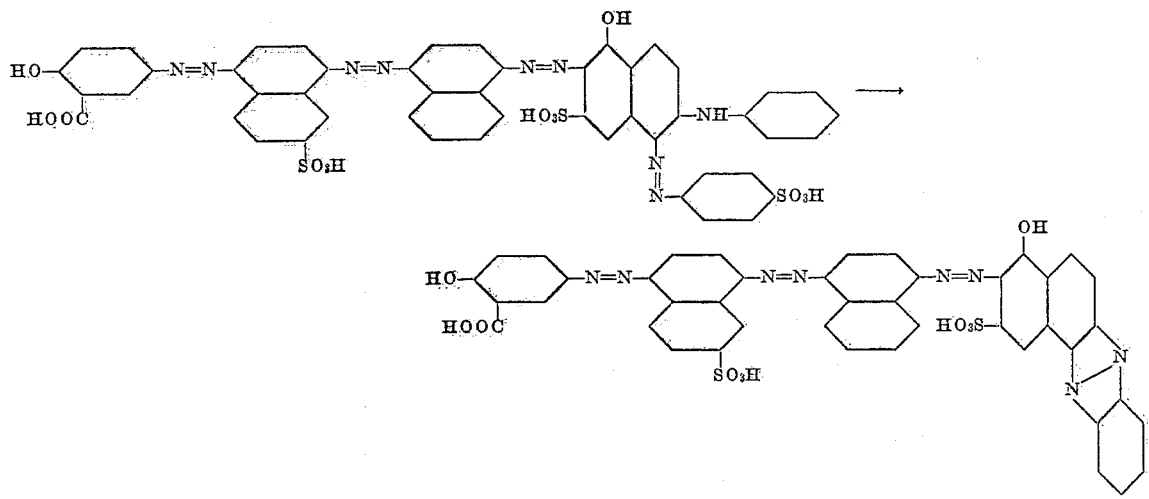

The aminodisazo dyestuff (which is obtained from 15.3 parts of the 4-aminosalicylic acid) of the formula

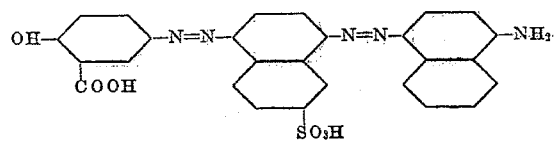

is dissolved in hot water, treated with common salt and 7 parts of sodium nitrite and after cooling to 0° C. added to 40 parts of hydrochloric acid and ice. When the diazotization is finished the diazo compound is filtered off, stirred with ice water and coupled in the presence of sodium carbonate with ice cooling with 54.3 parts of the sodium salt of the monoazo dyestuff obtained by the acid coupling of diazotised sulphanilic acid with 2-phenylamino-5-hydroxynaphthalene-7-sulfonic acid.

66 parts of the tetrakisazo dyestuff so obtained are then added with ice cooling to 600 parts of concentrated sulfuric acid and stirred for 2 hours at 5° C. The solution is then poured onto ice and water and the dyestuff worked up in the usual manner. It dissolves in hot water with a violet colour and in concentrated sulfuric acid with a blue colour and dyes cotton and regenerated cellulose in reddish-blue-grey shades of good fastness to light and to washing, which are still further improved by after-treatment with copper yielding agents.

Example 7

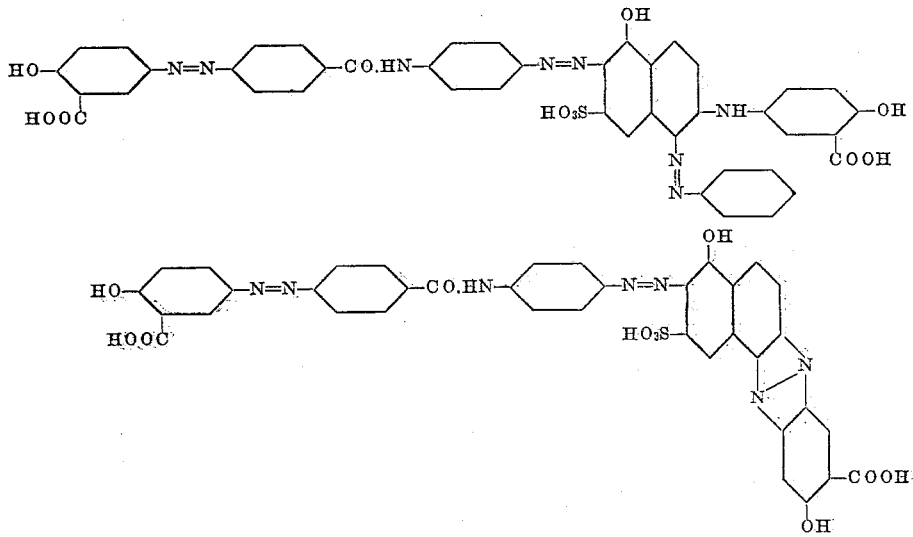

22.7 parts of 4.4'-diaminobenzanilide are tetrazotised as usual and coupled with 13.8 parts of salicylic acid in an alkaline medium so as to form the intermediate compound. Thereupon a solution made alkaline with sodium carbonate of 52.3 parts of the sodium salt of the monoazo dyestuff obtained by acid coupling of diazotised aniline with 2-(4'-hydroxy-3'-carboxy)-phenylamino-5-hydroxynaphthalene-7-sulfonic acid is added thereto. For accelerating the coupling 5–10% by volume of pyridine can be added. When the coupling is finished, the dyestuff is isolated, stirred at room temperature in concentrated sulfuric acid, and after 2 hours stirring the azine body is separated. It forms a brown powder which dissolves in hot water with a brown colour and in concentrated sulfuric acid with a black-brown colour. Cotton and regenerated cellulose are dyed in brown shades. By after-treatment of the fibres with copper yielding agents the fastness is improved without the shade of the dyeing being appreciably altered.

excellent fastness properties to light and to washing when after-treated with copper yielding agents.

The dyestuff may be converted into a copper complex by the usual methods. This complex dyes cotton and regenerated cellulose in greenish-grey shades of outstanding fastness to light and to washing.

*Example 9*

17.8 parts of 4.6-dichlor-2-aminophenol are

*Example 8*

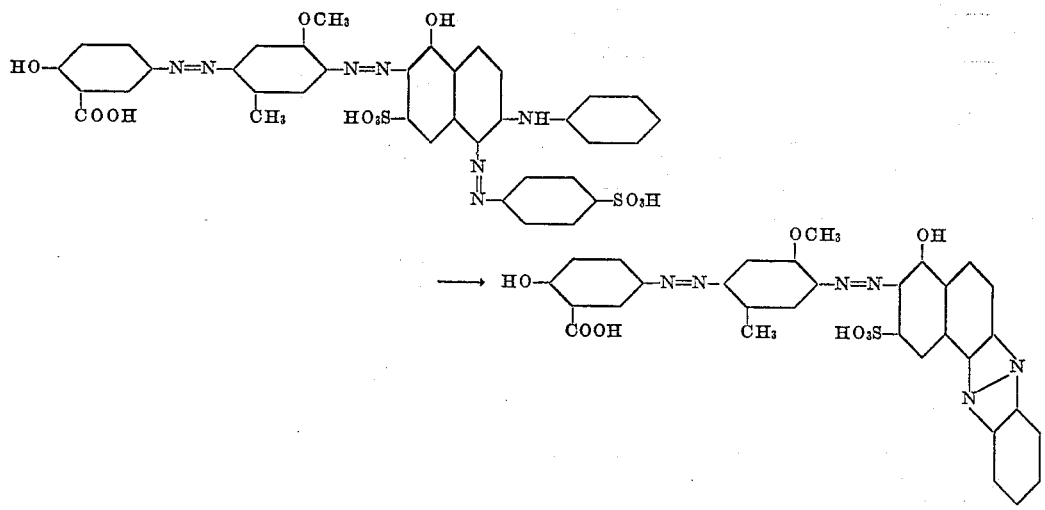

The aminoazo dyestuff of the formula:

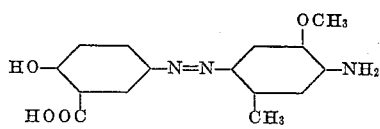

from 15.3 parts of 4-aminosalicylic acid is dissolved in hot water, then common salt and 7 parts of sodium nitrite are added, and after cooling to 0° C. the solution is poured into 40 parts of hydrochloric acid and ice. The resultant diazo compound is further treated after the manner described in the first paragraph of Example 6.

85.5 parts of the so-obtained trisazo dyestuff are added to 800 parts of concentrated sulfuric acid at 20–30° C. and stirred for 2 hours at 20–30° C. The mixture is then poured into a mixture of ice and water and the dyestuff worked up according to known methods. It dissolves in hot water with a violet shade and dyes cotton and regenerated cellulose in bluish-grey shades showing diazotised in the usual manner and coupled with ice cooling in the presence of sodium carbonate with 64.5 parts of the monoazo dyestuff obtained by the acid coupling of diazotised 1-amino-benzene-disulfonic acid with 2-(2'-naphthylamino)-5-hydroxynaphthalene-7-sulfonic acid. 5–10 per cent by volume of pyridine can be added to facilitate the coupling operation. The dyestuff thus obtained dissolves in hot water with a dark bluish-red colour and in concentrated sulphuric acid with a dark green colour. In order to close the azine ring it is added at 40° C. to 650 parts of concentrated sulfuric acid, stirred for 2 hours at 40° C., poured into ice and water and isolated; the azine dyestuff is a dark powder which dissolves in hot water with a blue colour and in concentrated sulfuric acid with a green colour. Wool is dyed from acid baths in brown shades and by after-chroming in grey shades with noteworthy fastness properties.

The following list shows further examples of dyestuffs obtained according to the process.

| Copper complex of— | Dyeings on cotton |
|---|---|
| (structure shown) | blue-grey |

| Copper complex of— | Dyeings on cotton |
|---|---|
| | reddish-grey |
| | reddish-grey |
| | blue-grey |
| | blue-grey |
| | |

| Copper complex of— | Dyeings on cotton |
|---|---|
| 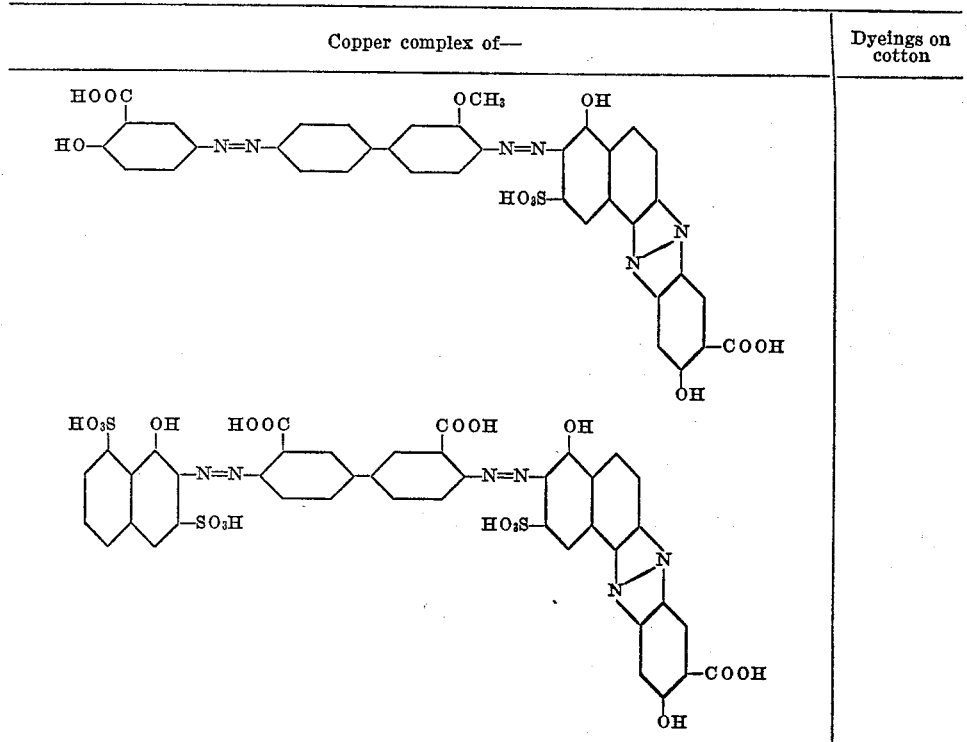 | |

What we claim is:
1. A process for the manufacture of an azo dyestuff containing the azine ring, comprising the step of subjecting an azo dyestuff which corresponds to the formula

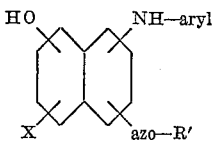

wherein the naphthalene radical contains at least one nuclearly linked $SO_3H$ group, aryl stands for a radical containing at least one free o-position to the NH group and is selected from the class consisting of mononuclear radicals of the benzene series and binuclear radicals of the naphthalene series, and R' stands for a radical selected from the class consisting of mononuclear radicals of the benzene series and binuclear radicals of the naphthalene series, and X stands for a radical containing at least one azo group, each last-named azo group being connected within the radical X to a member selected from the class consisting of mononuclear radicals of the benzene series, binuclear radicals of the naphthalene series and binuclear radicals of the diphenyl series, and wherein X is in o-position to the OH group and azo-R' is in o-position to the NH-aryl group, to the action of an agent selected from the class consisting of acids and acid salts, until the corresponding azine ring-containing azo dyestuff is produced.

2. A process for the manufacture of azo dyestuff containing the azine ring, comprising the step of subjecting an azo dyestuff which corresponds to the formula

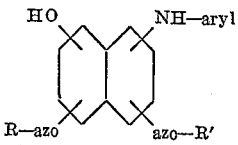

wherein the naphthalene radical contains at least one nuclearly linked $SO_3H$ group, aryl stands for a mononuclear radical of the benzene series containing at least one free o-position to the NH group, and each of R' and R stands for a mononuclear radical of the benzene series, and wherein R-azo is in o-position to the OH group and azo-R' is in o-position to the NH-aryl group to the action of a mineral acid until the corresponding azine ring-containing azo dyestuff is produced.

3. A process for the manufacture of an azo dyestuff containing the azine ring, comprising the step of subjecting an azo dyestuff which corresponds to the formula

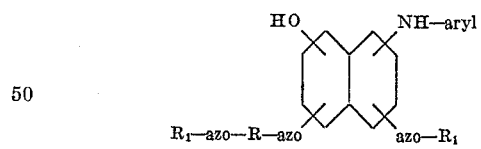

wherein the naphthalene radical contains at least one nuclearly linked $SO_3H$ group, aryl stands for a mononuclear radical of the benzene series containing at least one free o-position to the NH group, and each of R', R and $R_1$ stands for a mononuclear radical of the benzene series, and wherein $R_1$-azo-R-azo is in o-position to the OH group and azo-R' is in o-position to the NH-aryl group to the action of a mineral acid until the corresponding azine ring-containing azo dyestuff is produced.

4. A process for the manufacture of an azo dyestuff containing the azine ring, comprising the step of heating with a mineral acid an azo dyestuff which corresponds to the formula

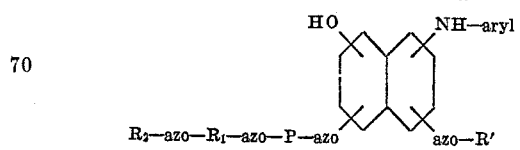

wherein the naphthalene radical contains at least one nuclearly linked $SO_3H$ group, aryl stands for a mononuclear radical of the benzene series containing at least one free o-position to the NHprises the step of subjecting the azo dyestuff of the formula

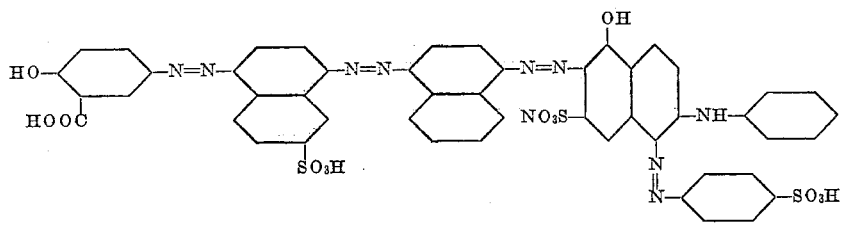

group, and each of R′, R, R₁ and R₂ stands for a mononuclear radical of the benzene series, and wherein R₂-azo-R₁-azo-R-azo is in o-position to the OH group and azo-R′ is in o-position to the NH-aryl group.

5. A process for the manufacture of an azo dyestuff containing the azine ring, which comprises the step of subjecting the azo dyestuff of the formula to the action of a mineral acid until the corresponding azine ring-containing azo dyestuff is produced.

9. An azo dyestuff of the formula

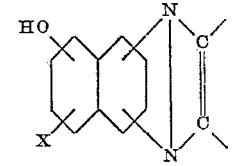

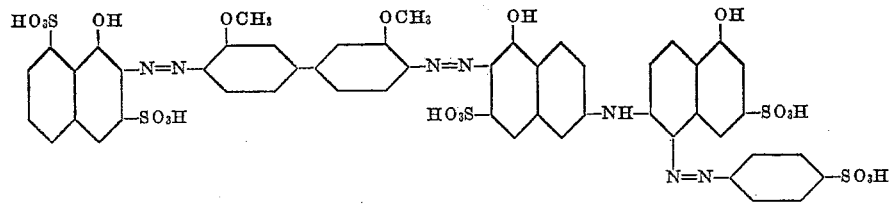

to the action of a mineral acid until the corresponding azine ring-containing azo dyestuff is produced.

6. A process for the manufacture of an azo dyestuff containing the azine ring, which comprises the step of subjecting the azo dyestuff of the formula

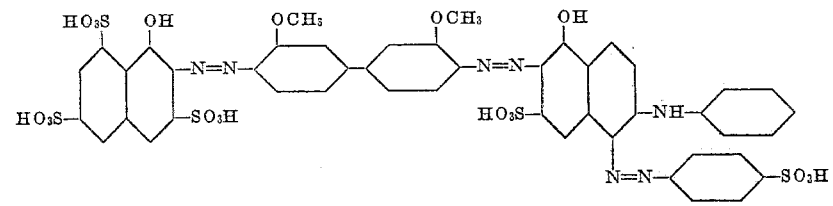

wherein the naphthalene radical contains at least one nuclearly linked SO₃H group,

to the action of a mineral acid until the corresponding azine ring-containing azo dyestuff is produced.

7. A process for the manufacture of an azo dyestuff containing the azine ring, which comprises the step of subjecting the azo dyestuff of the formula

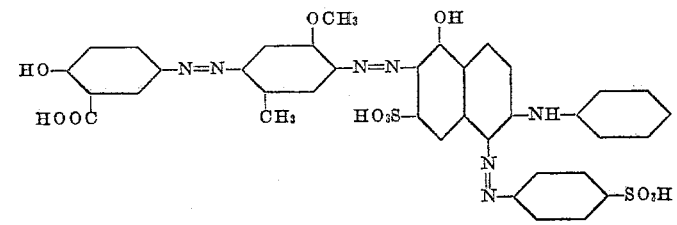

to the action of a mineral acid until the corresponding azine ring-containing azo dyestuff is produced.

8. A process for the manufacture of an azo dyestuff containing the azine ring, which comis a portion of a member selected from the group consisting of radicals of the benzene and naphthalene series, and X stands for a radical containing at least one azo group, each said azo group being connected within the radical X to a member selected from the group consisting of radicals of the benzene and naphthalene series, and wherein both N-atoms are in o-position to each other with respect to the naphthalene radical, and X is in o-position to the OH group.

10. An azo dyestuff of the formula

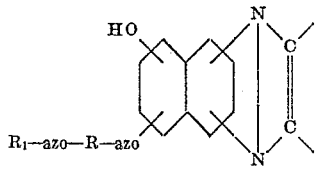

wherein the naphthalene radical contains at least one nuclearly linked $SO_3H$ group,

is a portion of a mononuclear radical of the benzene series, and each of $R_1$ and $R$ stands for a mononuclear radical of the benzene series, and wherein both N-atoms are in o-position to each other with respect to the naphthalene radical, and $R_1$-azo-R-azo is in o-position to the OH group.

11. An azo dyestuff of the formula

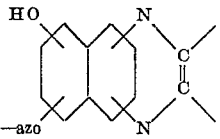

wherein the naphthalene radical contains at least one nuclearly linked $SO_3H$ group,

is a portion of a mononuclear radical of the benzene series, and each of $R_2$, $R_1$ and $R$ stands for a mononuclear radical of the benzene series, and wherein both N-atoms are in o-position to each other with respect to the naphthalene radical, and $R_2$-azo-$R_1$-azo-R-azo- is in o-position to the OH group.

12. The azo dyestuff of the formula

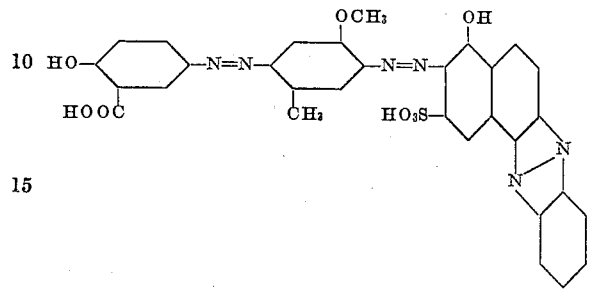

13. The azo dyestuff of the formula

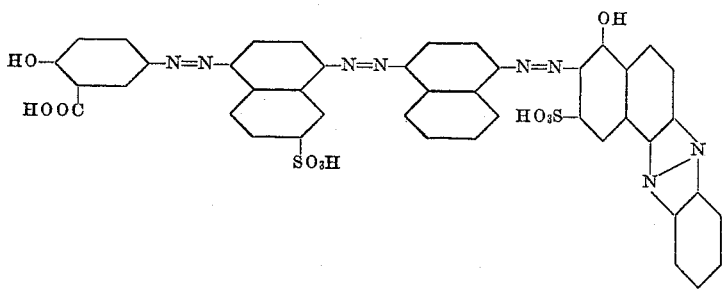

ERNST ISELIN.
WALTER WEHRLI.

REFERENCES CITED

The following references are of record in the file of this patent:

UNITED STATES PATENTS

| Number | Name | Date |
|---|---|---|
| 1,877,743 | Straub et al. | Sept. 13, 1932 |
| 2,435,356 | Kaiser | Feb. 3, 1948 |
| 2,529,527 | Wehrli et al. | Nov. 14, 1950 |